(12) United States Patent
Stanton

(10) Patent No.: US 7,941,964 B2
(45) Date of Patent: May 17, 2011

(54) MULTIPLE USE FISHING ASSEMBLY

(76) Inventor: Kim Stanton, Davie, FL (US)

(*) Notice: Subject to any disclaimer, the term of this patent is extended or adjusted under 35 U.S.C. 154(b) by 274 days.

(21) Appl. No.: 11/888,178

(22) Filed: Oct. 6, 2008

(65) Prior Publication Data

US 2010/0083557 A1 Apr. 8, 2010

(51) Int. Cl.
*A01K 97/10* (2006.01)
(52) U.S. Cl. .......................................... 43/21.2; 248/512
(58) Field of Classification Search ................ 43/21.2, 43/23, 18.1 R–26
See application file for complete search history.

(56) References Cited

U.S. PATENT DOCUMENTS

| | | | | |
|---|---|---|---|---|
| 2,430,112 A * | 11/1947 | Hamre | ...................... | 248/515 |
| 3,802,112 A * | 4/1974 | Banner | ...................... | 43/21.2 |
| 4,551,939 A * | 11/1985 | Kitchens | ...................... | 43/21.2 |
| 4,852,290 A * | 8/1989 | Wallace et al. | ...................... | 43/17 |
| 4,869,195 A * | 9/1989 | Eichfeld | ...................... | 114/364 |
| 5,068,996 A * | 12/1991 | Shank | ...................... | 43/21.2 |
| 5,438,789 A * | 8/1995 | Emory | ...................... | 43/21.2 |
| 5,673,507 A * | 10/1997 | Stokes, Jr. | ...................... | 43/21.2 |
| 2005/0102881 A1* | 5/2005 | Legendziewicz | ...................... | 43/21.2 |
| 2007/0119089 A1* | 5/2007 | Nicholson | ...................... | 43/27.4 |

* cited by examiner

*Primary Examiner* — Kimberly S Smith
*Assistant Examiner* — Danielle Clerkley

(57) ABSTRACT

The present invention is a multiple use fishing assembly. This assembly includes a fishing rod holding unit capable of holding at least one fishing rod. This fishing rod holding unit is designed and configured to have various components removably secured thereto. One component is a removable outrigger assembly. When attached the fishing assembly of the present invention will be a combined fishing rod holding unit and outrigger. If the outrigger is not desired, then the user can remove the outrigger and optionally can removably secure an additional fishing rod holding apparatus. Such a configuration enables the user to select his desired fishing option. Consequently providing an apparatus that can successfully be used for trolling, kite, drift and bottom fishing.

15 Claims, 12 Drawing Sheets

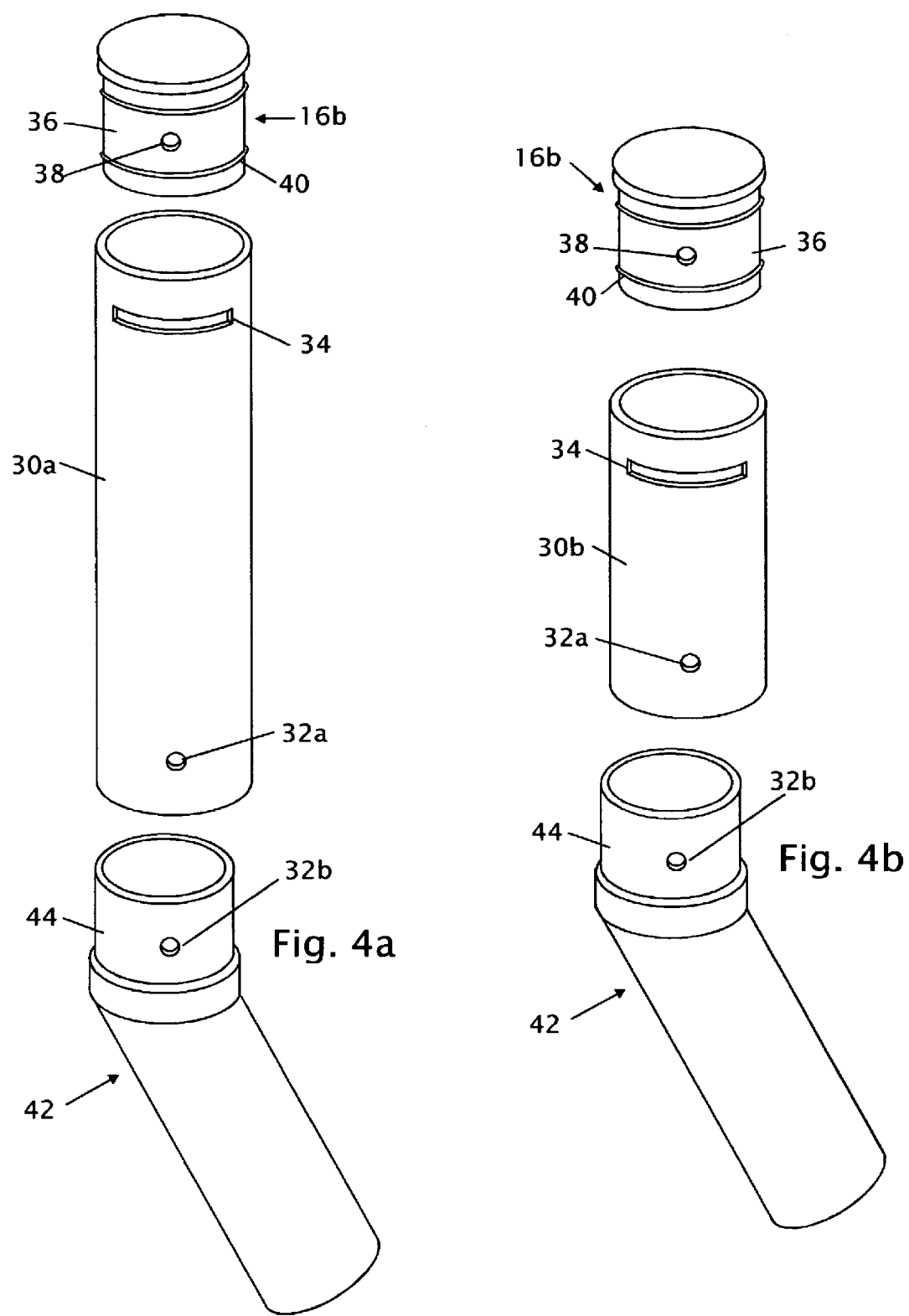

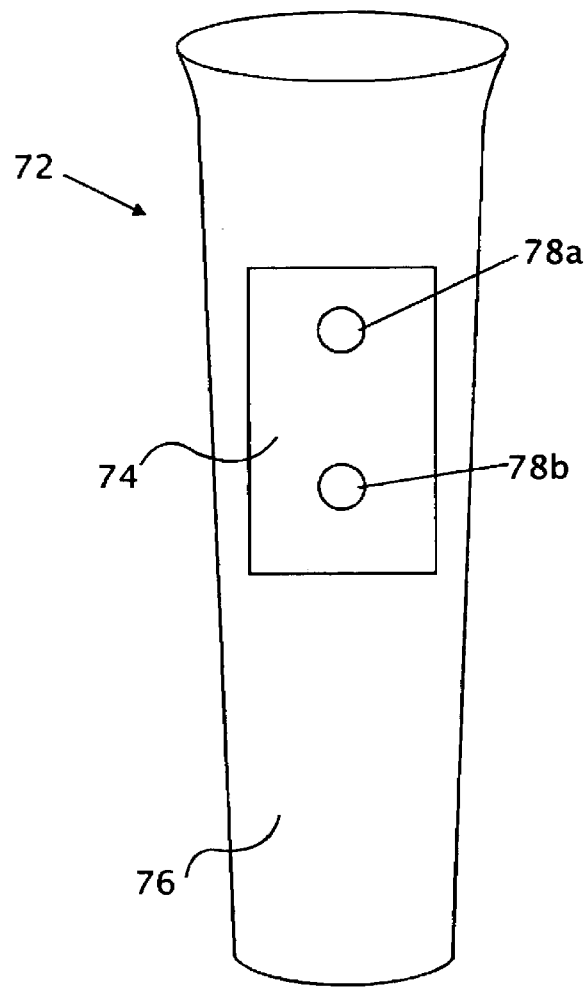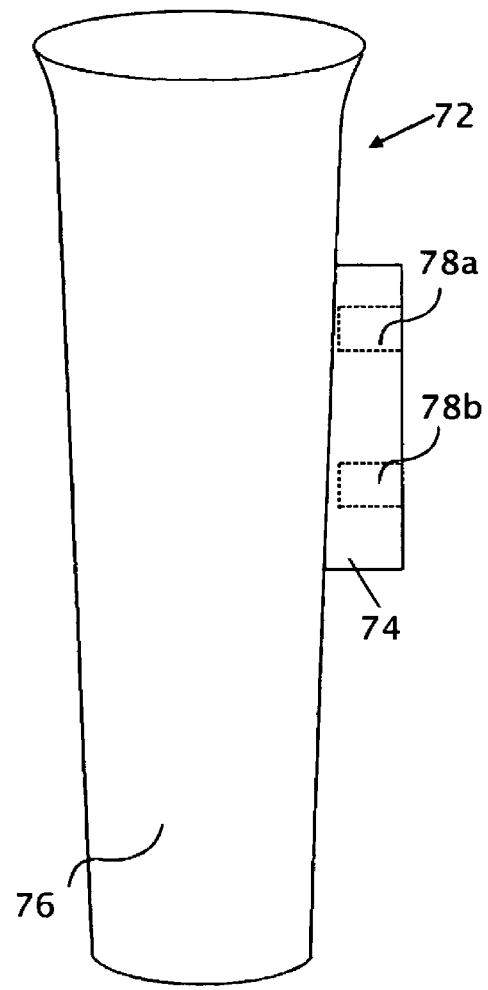
Fig. 6a                    Fig. 6b

MULTIPLE USE FISHING ASSEMBLY

BACKGROUND OF THE INVENTION

1. Field of the Invention

The present invention relates generally to a multiple use fishing assembly, and more particularly, to a fishing assembly that enables the use of a combined outrigger and fishing rod holding if desired or the option of a multiple rod holding device. Such a configuration for the multiple use fishing assembly provides an apparatus with a multitude of possibilities for fishing rod positions as well as the option of utilizing an outrigger for inherently enhancing and increasing the efficiency of fishing by providing the user a plurality of options.

2. Description of the Prior Art

Fishing is a sport that is easily enjoyed by millions of people, of ages, through out the world. Many products have been increasing the pleasure and effectiveness of fishing. Known products include fishing rod holders that can be attached to a boat, pier or the like. These devices allow the user to use a multiplicity of rods at a singular time. Though these devices are efficient, they can have some shortcomings. For example, when using several in close proximity, the lines of the rods can be tangled, causing a time consuming and exhausting occurrence.

To avoid tanglements, outriggers have been developed. Outriggers are generally utilized for commercial fishing. The purpose of outriggers is to allow for a multiplicity of lines to be extended out and away from other lines as well from the boat. Though outriggers can prevent tanglements, they can be costly and not readily available for the average fisherman.

As evidenced, various fishing rod holding assemblies as well as outriggers are well known to the prior art. Numerous devices are out on the market in a variety of forms and configurations so as to provide the consumer various options for adapting a rod holder assembly to suit their particular needs.

However, the current rod holders' assemblies on the market are limited in their scope and use. Accordingly, it can be seen that there exists a need for device that successfully combines a multiple fishing rod holding device in combination with an outrigger. Such an apparatus should be versatile, compact in size, light in weight and simple in construction so as to provide a device, which is successful, and can easily be used by any individual regardless of age, physical ability or dexterity.

Such a device is disclosed in U.S. Pat. No. 6,557,481 B1 issued to Schweid. In this patent there is disclosed a combined outrigger and a singular fishing rod holder. The present invention develops on the concept of the combined outrigger and fishing rod holder by providing an assembly that increases fishing capabilities, while being versatile in use and durable in operation.

As will be seen, the present invention achieves its intended purposes, objectives and advantages by accomplishing the needs as identified above, through a new, useful and unobvious combination of component elements, which are simple to use, with the utilization of a minimum number of functioning parts, at a reasonable cost to manufacture, assemble, test and by employing only readily available material.

SUMMARY OF THE INVENTION

The present invention is a unique multiple use fishing assembly. This unique assembly includes a fishing rod holding unit capable of holding at least one fishing rod. This fishing rod holding unit is designed and configured to have various components removably secured thereto. One component is a removable outrigger assembly. When attached the fishing assembly of the present invention will be a combined fishing rod holding unit and outrigger.

If the outrigger is not desired, then the user can remove the outrigger and optionally can removably secure an additional fishing rod holding apparatus. Such a configuration enables the user to select his desired fishing option. Consequently providing an apparatus that can successfully be used for trolling, kite, drift and bottom fishing.

To provide such apparatus, the present invention includes a first component, known as the fishing rod holding unit, a second component, known as the outrigger, and a third component, known as an additional fishing rod holding assembly. The second and third components are designed and configured to be removably secured to the first component. The unique formation of the first component is such that it can be used alone or optionally can be used with the second or third component.

As such the first component or fishing rod holding unit includes a base portion for enabling the apparatus to be removably secured to a flush mounted rod holder commonly located on the gunnel of a boat. The flush mounted rod holders are conventional in boats and are basically cylindrical openings intended to receive conventional fishing rods. Thereby, the base portion provides for the apparatus of the present invention to include an universal means for mounting to a conventional boat.

Enhancing the first component, the fishing rod holding unit includes at least one rod holder. Each rod holder is designed and configured to be slideably attached to the base portion. This arrangement will provide the user the option of providing the rod holder(s) to be close to the inside or outside of the boat gunnels. In addition, the angle of the holder(s) can be altered as well.

The second component, or outrigger, includes a boom having a slideable collar located thereon. To receive the desired fishing line, the collar includes a spring-loaded clip. Intrinsically allowing for the clip to receive the desired fishing line and permitting the user to slide the line via the collar to the desire location along the boom. Increasing the versatility, this boom can be adjusted angularly (left to right). Such a configuration is ideally suited for drift or bottom fishing.

If the outrigger is not desired, then the third component can be secured to the base. Being a fishing rod holder, this third component will innately increase the number of rods that the boat can hold. This third component is optional and it is to be understood that this feature can be added as desired by the user.

Accordingly, it is the primary object of the present invention to provide for a multiple use fishing assembly that includes at least one fishing rod holding assembly and a removable outrigger attached thereto.

Another object of the present invention is to provide for a multiple use fishing assembly that will increase the efficiency of fishing to inherently provide for a more enjoyable fishing experience.

Still another object of the present invention is to provide for a multiple use fishing assembly that is versatile in use so as to allow the user several options for permitting different types of fishing methods to be deployed, such as, but not limited to trolling, kite, drift, bottom fishing or the like.

Still a further object of the present invention, to be specifically enumerated herein, is to provide a multiple use fishing assembly in accordance with the preceding objects and which will conform to conventional forms of manufacture, be of simple construction and easy to use so as to provide a device that would be economically feasible, long lasting and relatively trouble free in operation.

Although there has been many fishing rod holding assemblies, outriggers and even combined outriggers and fishing rod holders, the present invention advances on their scope by providing a device that is simple in design, compact in size, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention taken in conjunction with the accompanying drawings.

BRIEF DESCRIPTION OF THE DRAWING

Similar reference numerals refer to similar parts throughout the several views of the drawings.

FIG. 4a is a front view of the first embodiment of the tower used with the first component, the fishing rod holding unit used in the multiple use fishing assembly of the present invention.

FIG. 4b is a front view of the second embodiment of the tower used with the first component, the fishing rod holding unit used in the multiple use fishing assembly of the present invention.

FIG. 6a is a rear view of the third component, known as the additional fishing rod holding of the multiple use fishing assembly of the present invention.

FIG. 6b is a side view of the third component, known as the additional fishing rod holding of the multiple use fishing assembly of the present invention.

DESCRIPTION OF THE PREFERRED EMBODIMENT

As illustrated in FIGS. 1-6b, the present invention is a multiple use fishing assembly 10. This assembly 10 includes a first component 12 known as the fishing rod holding unit. This fishing rod holding unit 12 is designed and configured to have various components removably secured thereto. One component is a removable outrigger assembly while another component is a removable fishing rod holder. The second and third components are optional features that are meant to enhance the fishing experience. Thereby providing for the first component to be used independently from the second and third components.

In essence, the present invention is a fishing assembly having fishing rod holding units that are adapted to maintain fishing poles. The use of the present invention allows the user versatility by rendering the fishing rod holding units to be altered angularly and horizontally, inherently altering the displacement of the fishing rods. If desired there is also the option of having an outrigger attached thereto. This outrigger is the second component. If that is not desired, then the user can increase his fishing capabilities by adding the third component or the additional fishing rod holder. Regardless of which components are utilized, the present invention will allow versatility and increase enjoyability by allowing the user the various options. This will provide for a unit that is ideally suited for trolling, kite, drift, and/or bottom fishing or the like. Inherently, providing the user flexibility during the use of the unit.

Figure 1:
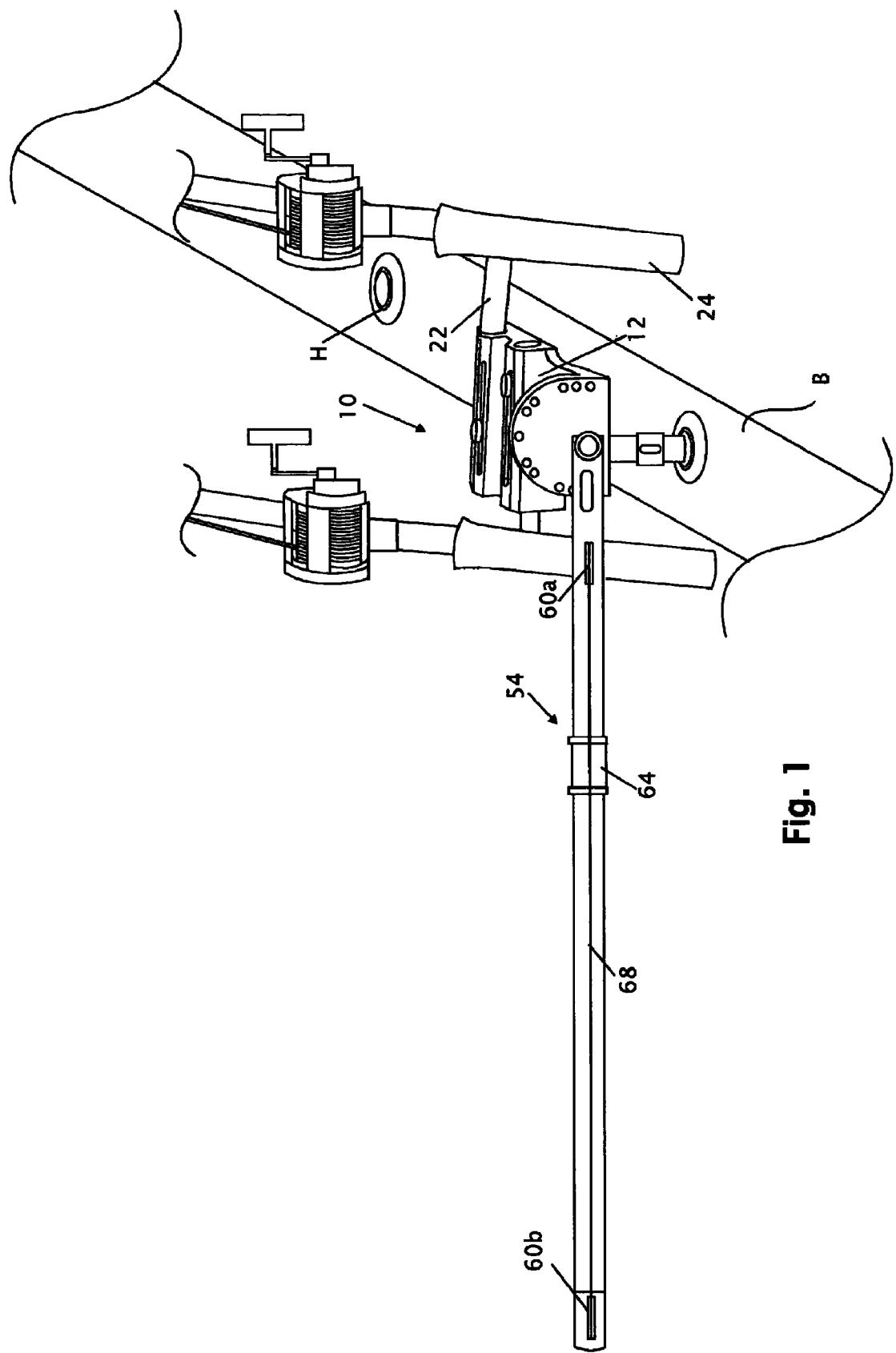
FIG. 1 is a rear perspective view of the multiple use fishing assembly of the present invention having the second component known as the outrigger, secured to the first component, known as the fishing rod holding unit.

To enable such a configuration, as seen in FIGS. 1-3b, the fishing rod holding unit 12 includes a base 14. The base 14 includes an upper portion 16a and a lower portion 16b. Secured to the upper portion 16a is at least one sleeve 18. In the preferred embodiment, and as is illustrated in the drawings, there is located two sleeves. The number of sleeves determines the number of fishing rod holding units that can be attached thereto. The use of two sleeves is ideal when fishing on a boat. As seen in FIG. 1, one rod can be located interiorly on the boat, while the second rod can be located exteriorly of the boat. Extending horizontally through each sleeve is a channel 20.

Figure 3A:
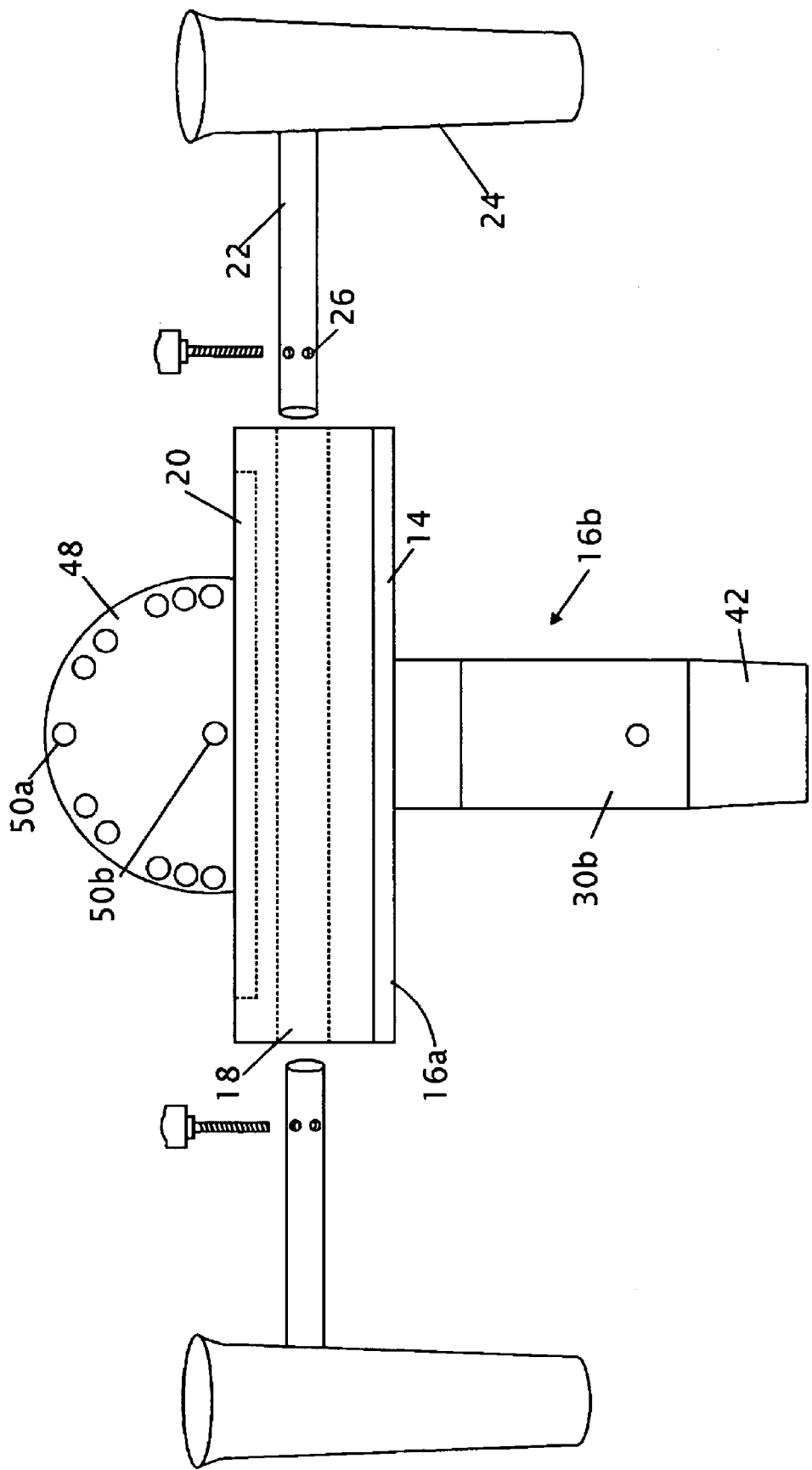
FIG. 3a is an exploded view of the fishing rod holding member prior to securement to the base of the multiple use fishing assembly of the present invention.
Figure 3B:
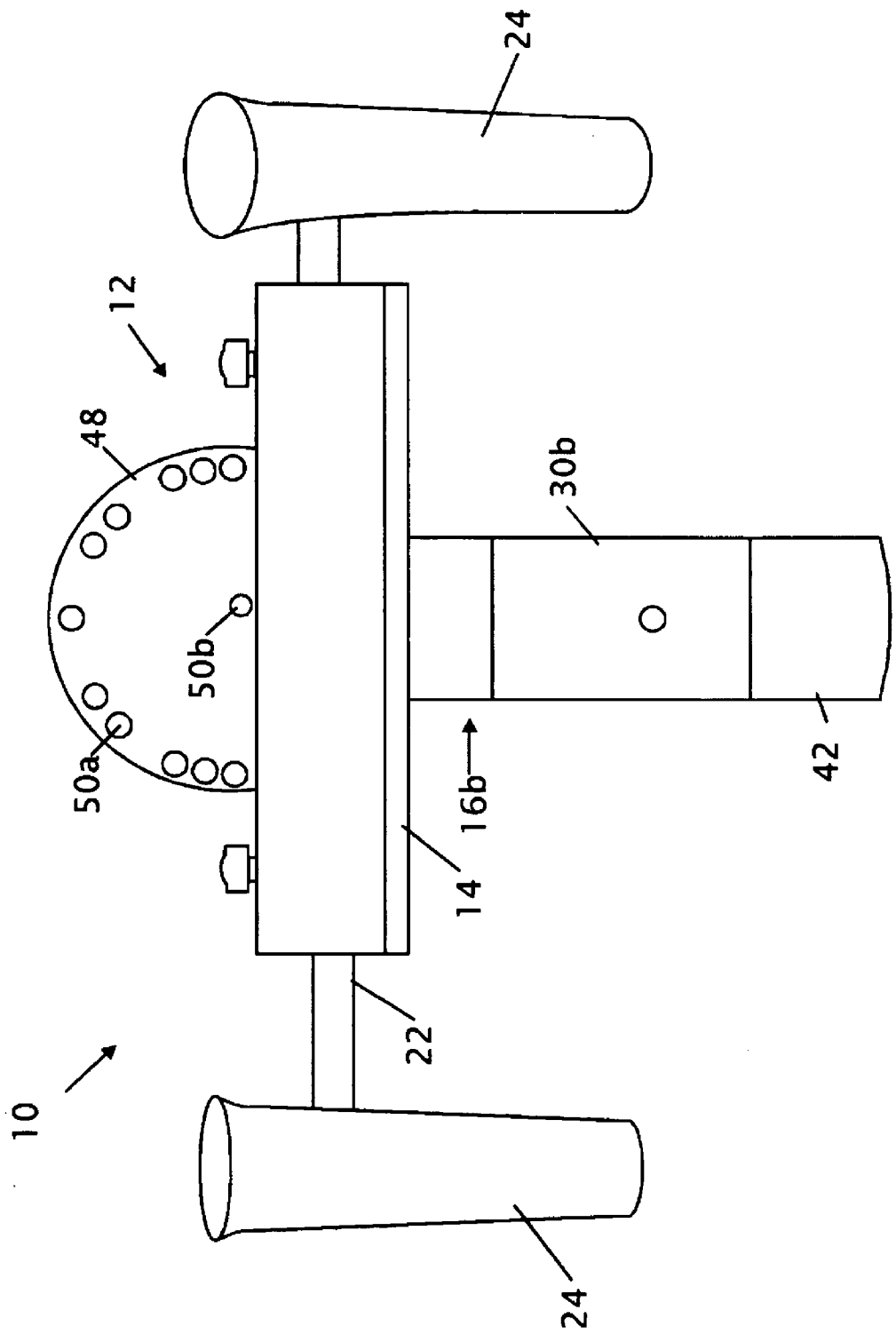
FIG. 3b is an front planar view the fishing rod holding member after securement to the base of the multiple use fishing assembly of the present invention.
Figure 3C:
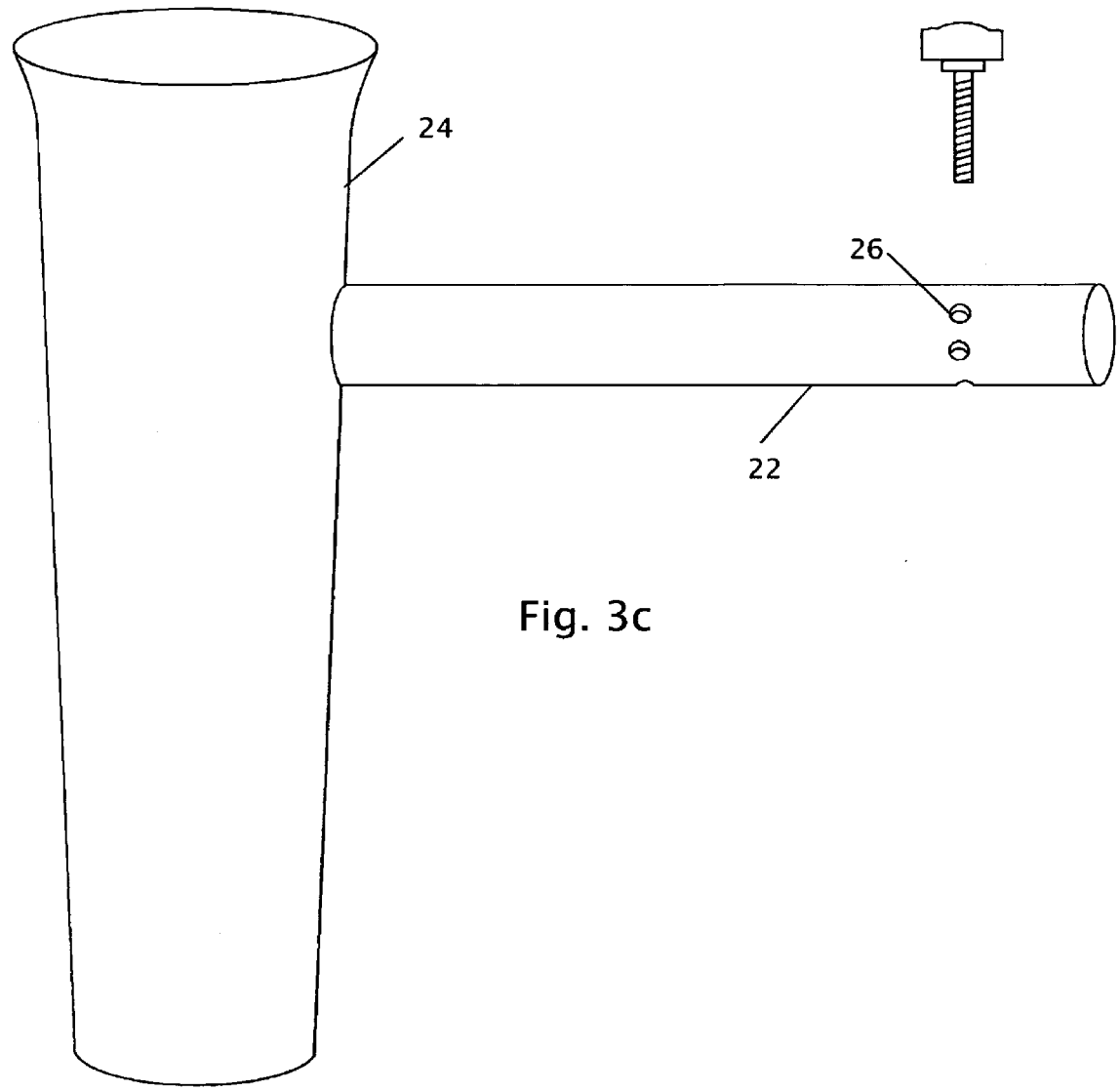
FIG. 3c is an enlarged view of the fishing rod holding member used in the multiple use fishing assembly of the present invention.

The sleeves 18 are designed and configured to slideable receive the fishing rod holding unit that is shown in FIGS. 3a, 3b and 3c. FIG. 3c illustrates this unit in detail. As seen in the figures, there is shown a tubular member 22. The tubular member includes outer ends, illustrated, but not labeled.

One end of the tubular member is to be received within the sleeve, as shown in FIGS. 1, 3a and 3b. This will allow for the tubular member to be slideably located within the sleeve. The second end includes a fishing rod holding member 24. As seen in the drawings, the fishing rod holding member 24 is an elongated hollow column having an enclosed bottom and open top. The structure of the column is such that it will adequately and successfully receive a conventional fishing rod. It's design can be altered so as to accepted and maintain any type or style of conventional fishing rods.

Located circumferencially around the second end of each tubular member is a plurality of apertures 26. In the preferred embodiment, the apertures are located 30 degrees apart. It is noted that the number and location of the holes are to optimized and simplify the fishing process while providing the angular rotation of the fishing rod holding member 24. The channel 20 and apertures 26 are constructed such as to receive a conventional locking member, illustrated, but not labeled. Thereby providing for a rotational adjustment means for the fishing rod holding member 24. Such a rotational adjustment means will enable the user to place their fishing pole in the desired angular position. In addition, the action of the tubular member sliding through each sleeve also enhances the present invention by allowing the user to slide the fishing rod holding member 24 to a desired position with respect to the side or gunnel of the boat B (the boat being partially shown in FIG. 1). This will yield a unique multiple use fishing assembly 10 that offers a plurality of options for the user. Thus, creating a device that will inherently increase the pleasure and success of fishing.

Thus, in order to assembly the unit, the tubular member 22 of the fishing rod holding unit is slideably inserted into the sleeve 18 of the base 12. Once at the desired horizontal location is achieved the user rotates the fishing rod holding member 24 to its desired position. The locking member, illustrated, but not labeled is inserted through the channel 20 and into an aperture 26 to locked the fishing rod holding unit 24 in a secured and desired position. This configuration will allow the user to adjust each rod independently and separately. Thus, as seen assembled in FIG. 3b, one rod is perpendicular to the base while the second rod is angularly secured thereto.

Figure 2A:
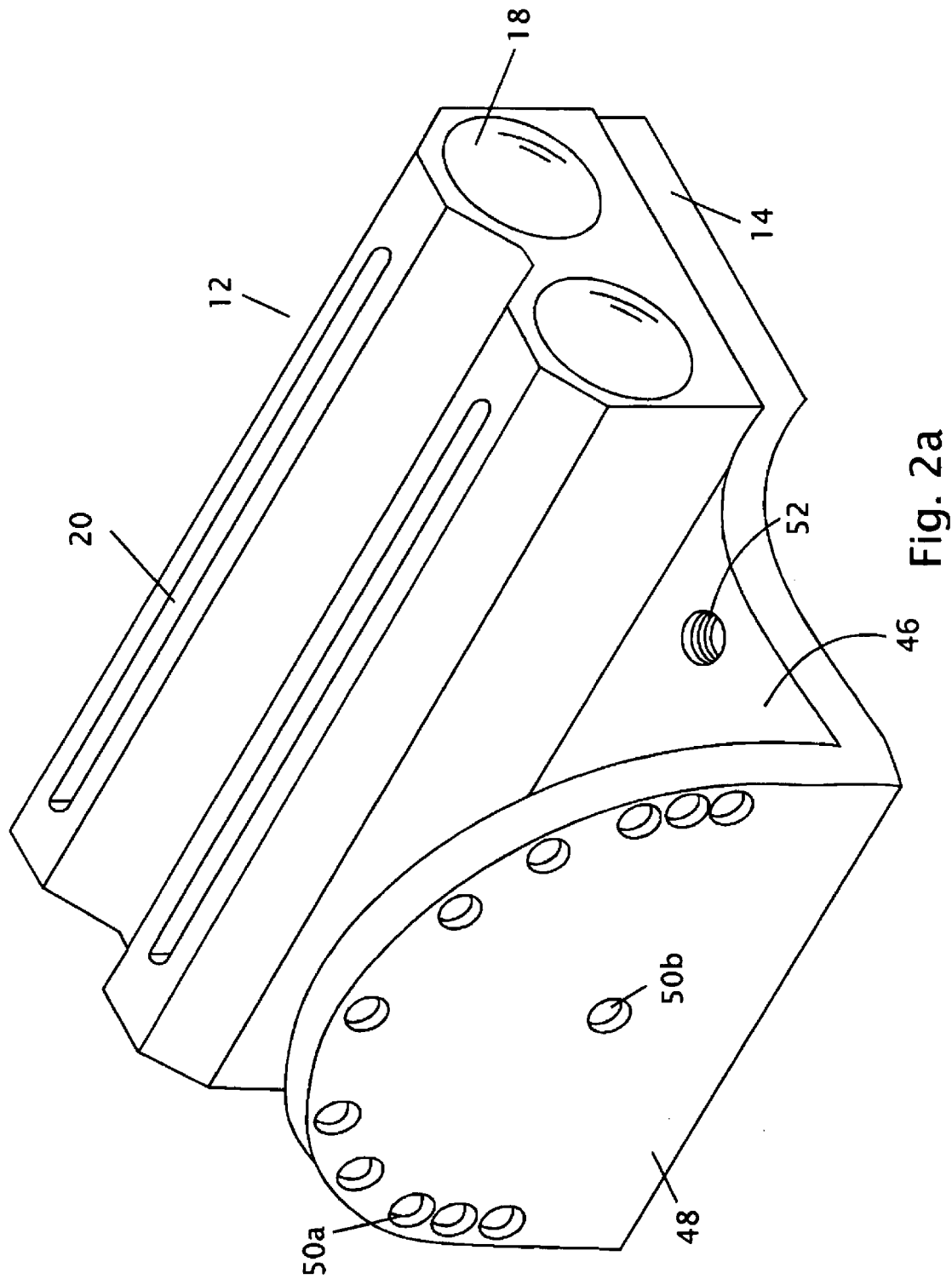
FIG. 2a is a side perspective view of the base for first component or fishing rod holding unit of the multiple use fishing assembly of the present invention.
Figure 2B:
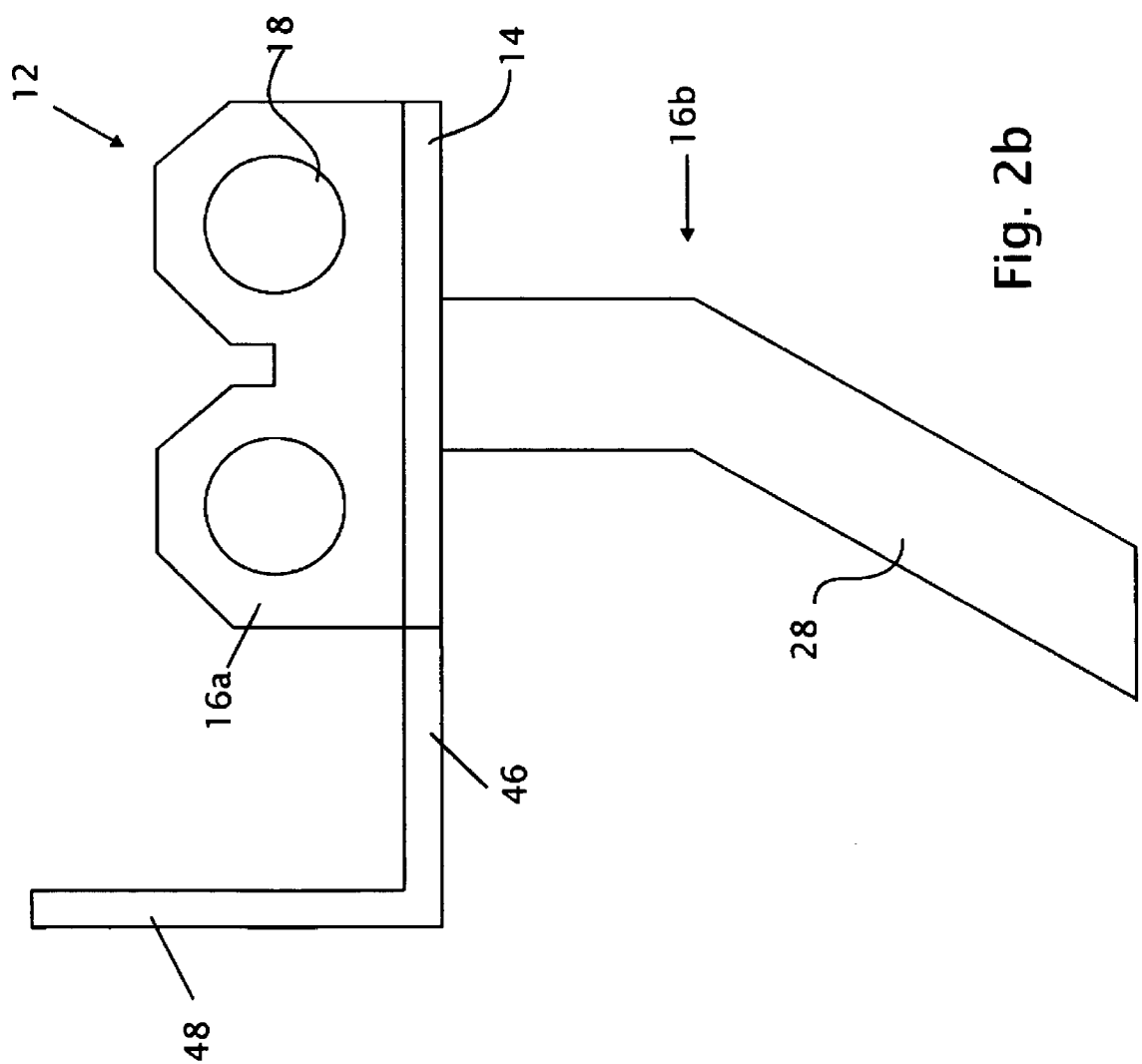
FIG. 2b is a side planar view of the base for first component or fishing rod holding unit of the multiple use fishing assembly of the present invention illustrating a first embodiment for the lower end of the base.

Extending downwardly from the base 14 of the fishing rod holding unit 12 is the lower portion 16b. The lower portion comprises a first embodiment and a second a second embodiment. The first embodiment is shown in FIG. 2a. As seen in this drawing the lower portion is a singular member having an upper end and a lower end. The upper end being secured to the base 14. The lower end 28 being designed to include an extension member angularly attached thereto. This angular attachment is specific to the flush mounted rod holders H (illustrated in FIG. 1 via the partially shown boat), and is conventionally known in the art. This will provide for the lower portion and the extension to be a singular member and not removable. In this configuration the lower end 28 is designed and configured to be received in the flush mounted rod holders of a boat. Thus in this configuration, the lower end includes an elongated shaft and the lower end 28 that is angularly disposed with respect to the elongated shaft.

Alternatively, and as seen in FIGS. 2c, 3a, 3b, 4a and 4b, the lower end of the lower portion 16b can be adapted to receive tower members 30a and 30b, in FIG. 3b. Towers members would be advantageous in the present invention and serves two purposes. The first purpose of the tower is to alter the height between the base and the boat. Another purpose of the tower is to adjust the position of the fishing poles by rotating the base with respect to the towers. The tower will remain fix, while the base can be rotated.

Figure 2C:
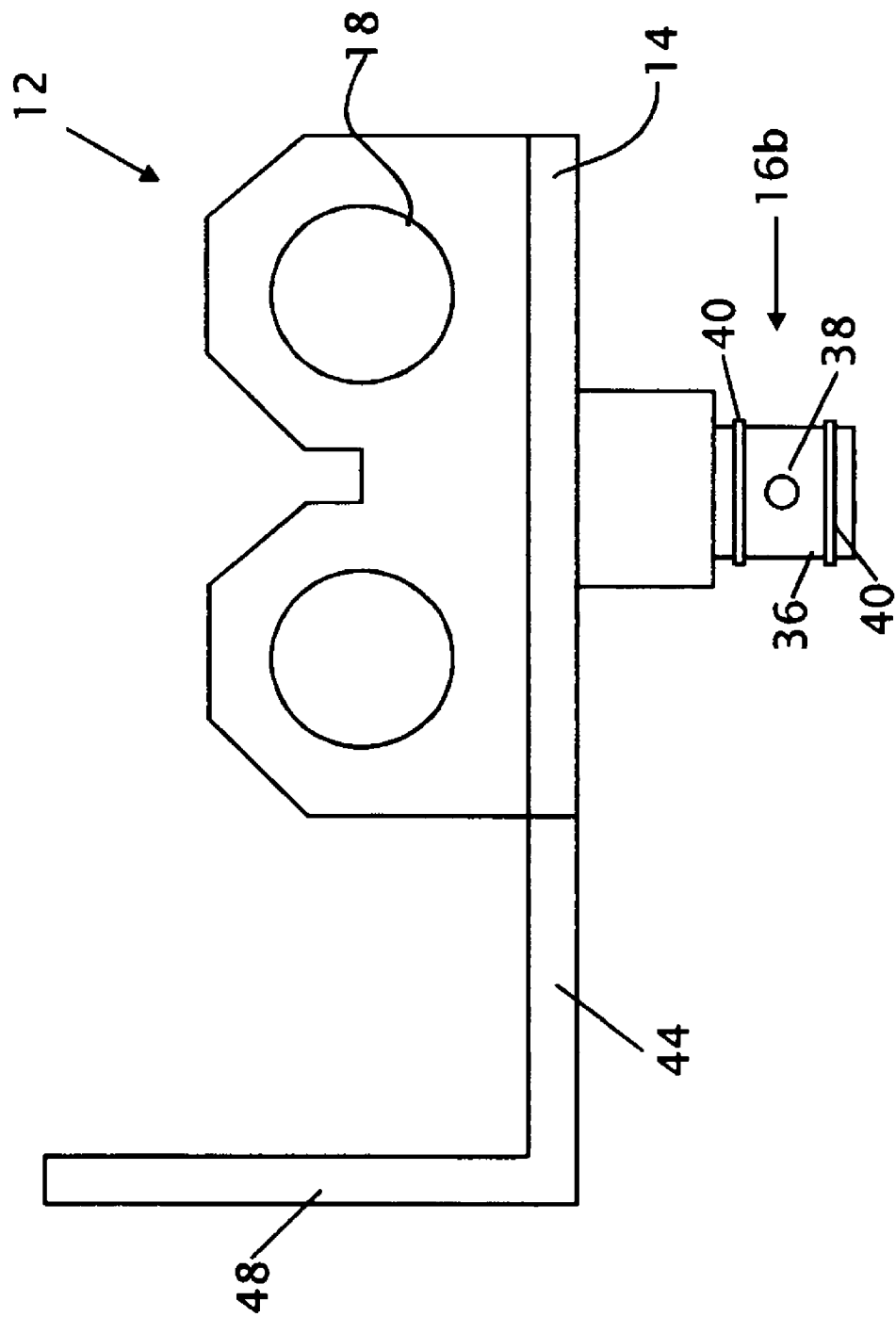
FIG. 2c is a side planar view of the base for first component or fishing rod holding unit of the multiple use fishing assembly of the present invention illustrating a second embodiment for the lower end of the base.

To enable such a configuration and to accept the towers, lower portion 16b of the base is altered in design. This alteration is shown in FIG. 2c and partially shown in FIGS. 4a and 4b. As seen the lower end includes a cylindrical member extending downwardly, illustrated but not labeled. Secured to this member is a protruding member 36. The protruding member 36 includes an aperture 38. O-rings 40 can be located above and below the aperture 38. The protruding member 36 is adapted to received with the towers.

The tower as seen in FIGS. 4a and 4b are substantially the same except for its height. As seen in the drawings, the first tower 30a being substantially taller than the second tower 30b. The towers have mating portions to receive and mate with protruding member 36. Each tower 30a and 30b, as seen in the drawings include a top end and a lower end. Located at the top of the tower and extending circumferencially through is a slot 34. The slot extending 90 degrees to 235 degrees, but preferably 190 degrees. The lower end can include two embodiments. In the first embodiment, as shown, an aperture 32a extends therethrough.

Thus, to use this tower 30a or 30b, the user inserts the protruding member 36 into the open top end. Aligning the aperture 38 to the desired angular position of the slot 34, a conventional pin or the locking device is inserted therein to lock the base to the tower.

As seen in FIGS. 4a and 4b, an angular member 42 is provided that is designed to be received in the fishing rod holder of a boat and to be removably secured to the lower end of the tower. This angular member extends rearwardly from the aperture 32a of the lower end of the tower. The angular member includes an upward flange member 44 having an aperture 32b located therein. This flange member 44 is received in the lower end of the tower. Once located therein, the aperture 32a of the tower and the aperture 32b of the angular member are aligned. Once aligned, a conventional locking pin is inserted therein. This will lock the tower to the angular member 42. Thus allowing the device to be placed in a conventional fishing rod holding unit located on a boat. Thereby the user can choose between a tower of high height, using the tower shown in FIG. 4a, medium height, using the tower shown in FIG. 4b or lower height, merely using the angular member 42. The use of the towers inherently alters the height of the fishing poles, while the slot 34 of the tower allows the base to swivel to a desired location. This will allow the fisherman more options for doing a fishing expedition. In the preferred embodiment, the height of the first tower is between three inches to ten inches in height. The second tower, in the preferred embodiment being between one inch to four inches in height.

Figure 4C:
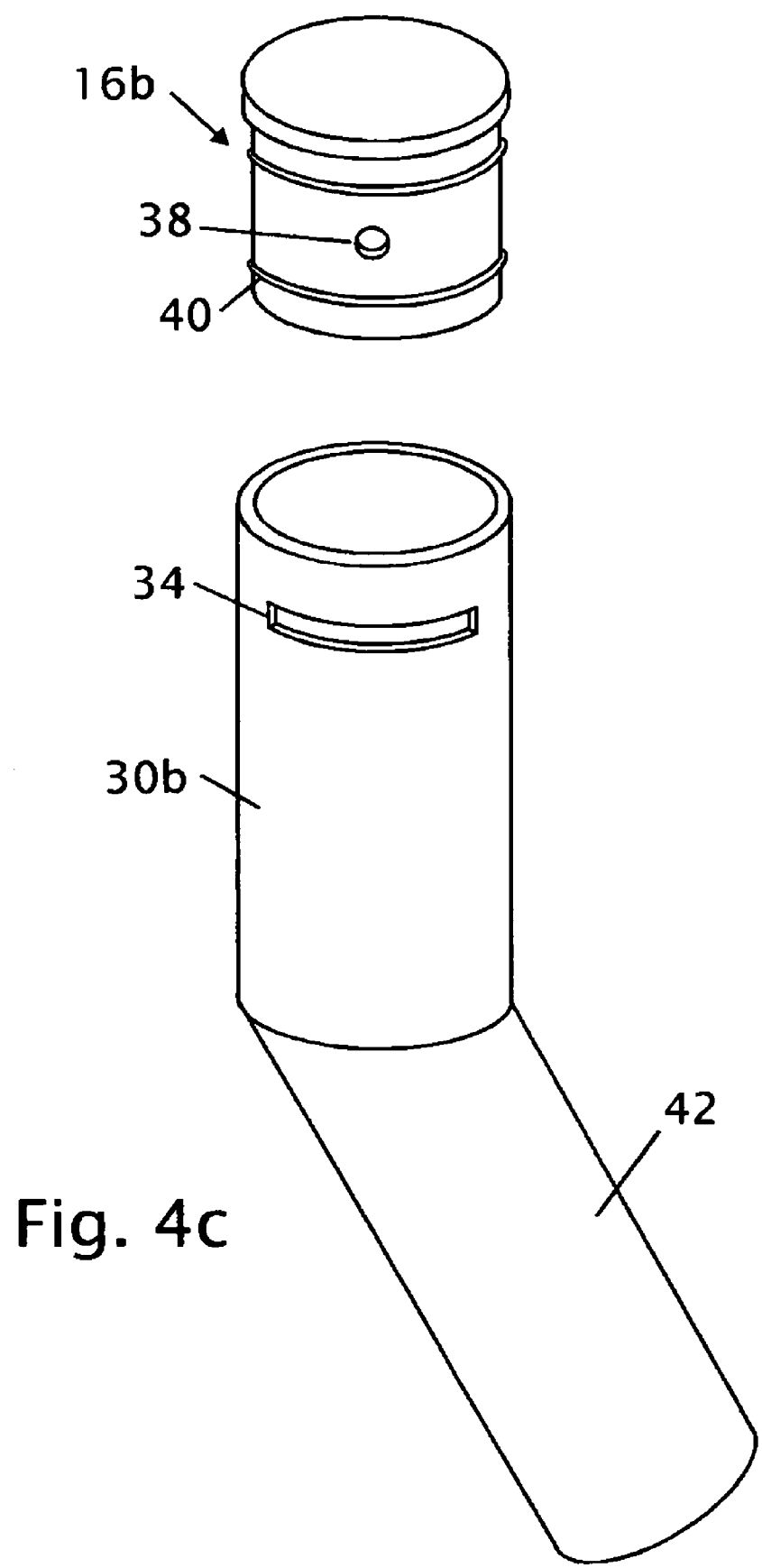
FIG. 4c is a front view of an alternative embodiment of the tower used with the first component, the fishing rod holding unit used in the multiple use fishing assembly of the present invention.
Figure 5A:
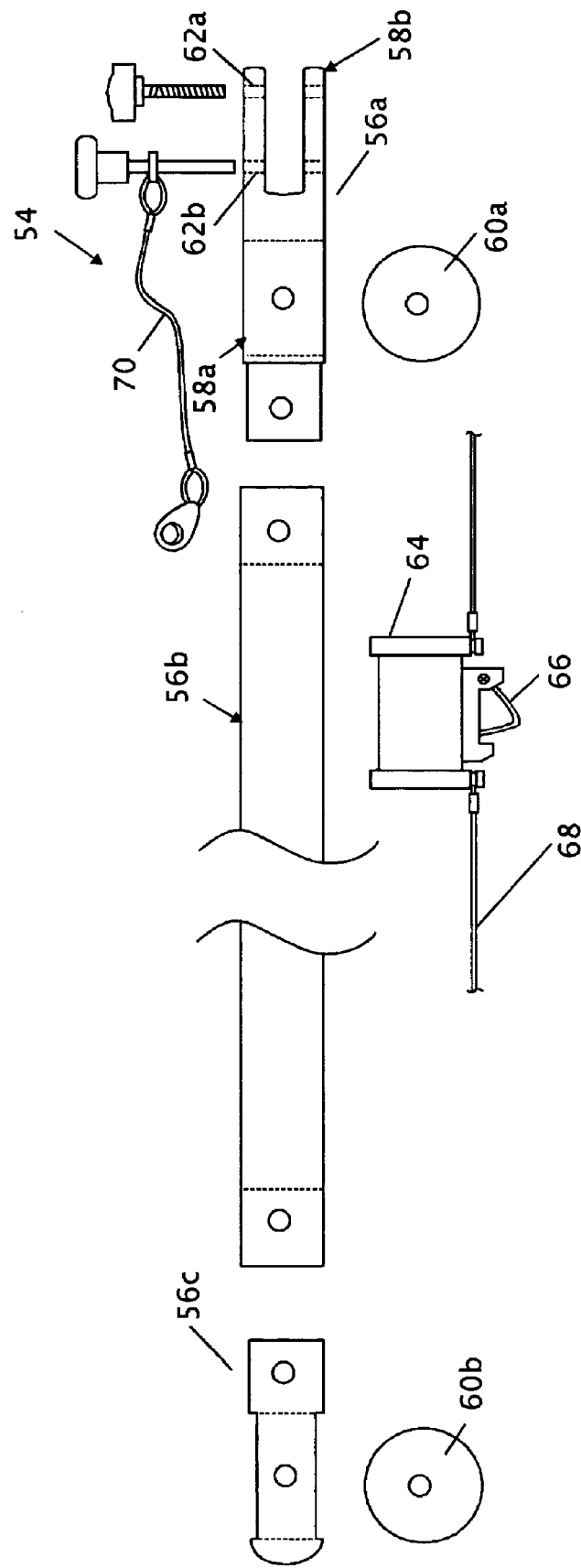
FIG. 5a is an exploded view of the second component, known as the outrigger, used in the multiple use fishing assembly of the present invention.
Figure 5B:
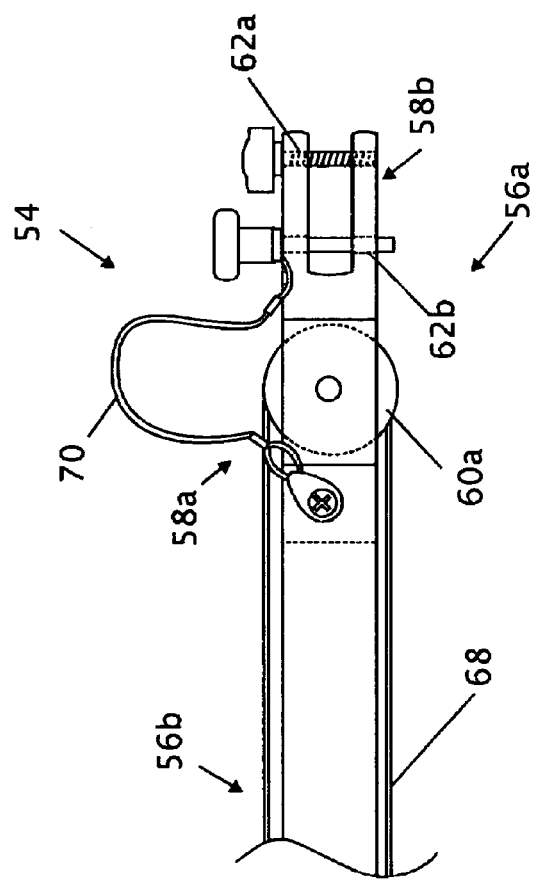
FIG. 5b is a side view of the assembled second component, know as the outrigger, used in the multiple use fishing assembly of the present invention.
Figure 5B:
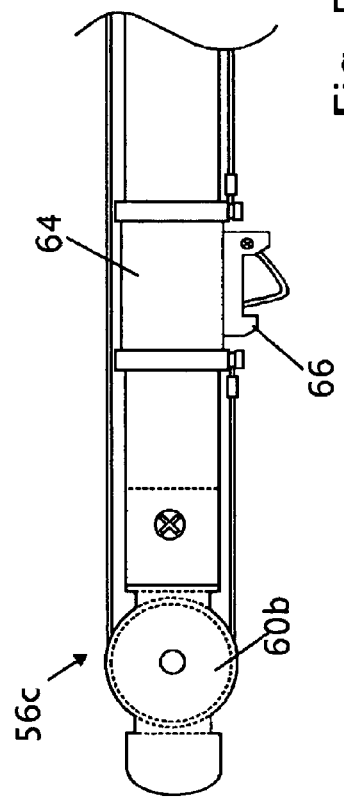

This angular member 40, as seen in FIG. 4c can be integral with the tower. This will eliminate the use of additional locking pins. Thereby providing for the tower and angular member to be a singular entity.

Optionally, and as seen in the drawings the base can include a rearwardly extending member 46. Secured upwardly from this extending member 46 is a flange 48. This flange 48 is designed and configured to removably receive the second component, the outrigger, or optionally, the third component, the additional fishing rod holder. As such, this flange includes an attaching means. The attaching means includes a plurality of openings 50a, radially disposed along the flange 48. A central opening 50b is also located on the flange 48. The openings are disposed in a semi-circular configuration. This will enable the first and second components to be secured at the desired angular position. Being disposed in a semi-circular position is also advantageous because the user can extend the first component, the outrigger from the left or right of the boat without having to remove the assembly of the present invention to the other side or location of the boat. The flange 48 can further include a threaded opening or openings 52. This threaded opening will permit for an eyelet or the like to be secured thereto. Thus, allowing for a leash or the like to be secured to the eyelet. In the preferred embodiment at least two threaded apertures are provided.

The second component of the present invention s shown attached to the first component in FIG. 1. The second component or outrigger 54 is shown in additional details in FIGS. 5a and 5b. As seen in the drawings, the outrigger or second component 54 includes an inner portion 56a, a middle portion or boom 56b, and an outer portion 56c. The inner portion 56a includes the attaching means for attaching the outrigger 54 to the flange 48.

Included on the inner portion is a first end 58a and a second end 58b. Housed at the first end 58a is a pulley wheel 60a. Located at the second end 58b is a pair of parallel disposed prong members. The inherent opening formed from the parallel prong members will receive the flange 48 of the base 12 from the first component. The pair of parallel prong members includes the attaching means. As seen, extending through the lower tip of the prong members is a first opening 62a. This first opening is adapted to align with the central opening 50b of the flange 48. Once aligned a removably secured pin is inserted therein. Located at the opposite end of the prong members is a second opening 62b. These openings are adapted to align with the radially disposed openings of the flange 48. Thus, allowing the outrigger to be at a desirable located angularly. Once the desired location is achieved, a second pin is inserted into the openings and secured into place. Preferably, and as seen in the drawings, the pin can be secured to the outrigger. This will prevent the user from losing or dropping the pin when fishing. Thus, when changing the angular position, the second pin is remove, allowing the outrigger to pivot via the central attaching point.

Housed at the outer portion 56c is a second pulley wheel 60b. Slideably located on the middle portion 56b is a collar 64. Secured to the collar 64 is a spring-loaded clip 66 adapted to removably receive a fishing line. A cable 68 is secured to one end of the collar 64 and extends around the first pulley wheel 60a, to the second pulley wheel 60b and then is secured to the second end of the collar. This will provide for a pulley system that allows the collar to move along the middle portion of the outrigger assembly 54.

Utilizing a collar that is slideably located on a boom or middle portion 56b consequently provides for a unit that is structurally sound and exceptionally durable.

Thus, to secure this second component or outrigger 54, to the first component or fishing rod holding unit 12, the user aligns the central opening of the flange 48 with the first opening 62a of the prong members. Once aligned a conventional pin is inserted therein. The user determines the angle for the outrigger and aligns the second opening 62b of the prong members with one of the openings of the radically disposed openings of the flange. Thus, the outrigger is secured. If the user wishes to adjust the angular position of the outrigger, he merely loosens the first pin located within the first opening and central opening. The second pin is removed completely. This will allow for the outrigger 54 to pivot about the loosened pin. Once the new desired location is decided, the holes are aligned and the second pin inserted therein. The first pin is tightened and operation of the assembly 10 of the present invention is continued.

To ensure the user from losing or dropping the outrigger into the water, a cable 70 secures the inner end 56a to the middle end of the outrigger. As seen in the drawings, conventional means secures the inner portion 56a to the middle portion 56b and the middle portion to the outer portion 56c. This securement is shown as holes and screws, but not labeled. It is noted that any form of conventional securement can be utilized with the present invention. Cable 70 is secured via the conventional means.

If the outrigger 54 is not desired and the user wishes to increase his fishing capabilities then the third component 72, the additional fishing rod holder, can be attached to the flange 48. This component is shown in FIGS. 6a and 6b. As seen, the third component 72 comprises a base member 74 and a fishing rod holding unit 76. The base member 74 includes two openings 78a and 78b, vertically disposed. The lower opening 78b being designed to align with the central opening 50b of the flange. The upper opening 78a being designed to align with an opening from the radially disposed openings 50a of the flange 44.

Once aligned, a conventional pin is inserted therein for locking and securing the third component 72 to the first component 12. The fishing rod holding unit 76 comprises an elongated hollow member having an open top end and an enclosed lower end. The open top end is to receive a conventional rod and the lower end maintains the rod therein.

It is to be understood, by those skill in the art, that the apertures, holes and openings used to receive the various pins can be of any conventional configuration. Preferably, the apertures, holes and openings are threaded and are designed to receive threaded pins. The exception being the pin used for adjusting the angle of the outrigger. This pin is not threaded and is to provide for quick removal and adjustment.

While the invention has been particularly shown and described with reference to an embodiment thereof, it will be understood by those skilled in the art that various changes in form and detail may be made without departing from the spirit and scope of the invention.

I claim:

1. A multiple use fishing assembly comprising:
    A first component;
        said first component including a base; wherein said base comprises an upper portion and a lower portion;
        said base further comprising a rearwardly extending member, and a flange extending upwardly from said rearwardly extending member;
    at least one fishing rod holding member removably horizontally slideably secured to said upper portion of said base via a sliding means;
        said sliding means comprising a sleeve secured to said upper portion of said base and a tubular member secured to each of said at least one fishing rod holding member for enabling said sleeve to receive said tubular member;
    a locking member removably secured to said sleeve and said tubular member for locking said sleeve to said tubular member in a fixed position;
    an extension member secured to said lower portion of said base for enabling said extension member to fit into a conventional fishing rod holder of a boat;
    an outrigger device removably secured to said rearwardly extending member via a securing means, and wherein said outrigger device includes an outer portion, middle portion and an inner portion, said outer portion and said inner portion each including a pulley wheel, said inner portion being removably secured to said flange of said base, a collar having a spring loaded clip thereon being slideably located on said middle portion of said outrigger, a cable being secured to one end of said collar and extends around said first pulley to said second pulley and secured to a second end of said collar to enable said collar to slideably travel on said middle portion of said outrigger.

2. A multiple use fishing assembly as in claim 1 further comprising said tubular member and said sleeve include a rotational adjustment means for enabling said tubular member to rotate freely with respect to said base, said locking member being adapted to secured said sleeve and said tubular member is a desired angle and horizontal fixed position.

3. A multiple use fishing assembly as in claim 2 wherein said extension member is removably secured to said base via a removable attaching means, a first tower including a first end and a second end, said first end is designed to be removably secured to said base via said attaching means, said second end is designed to be removably secured to said extension member via said attaching means, a second tower being shorter in height than said first tower, said second tower includes a first end and a second end, said first end of said second tower is designed to be removably secured to said base via said attaching means, said second end of said second tower is designed to be removably secured to said base via said attaching means, where said extension, said first tower and said second tower enable a height alteration for altering height of said fishing assembly.

4. A multiple use fishing assembly as in claim 2 wherein said base includes two sleeves, each sleeve being adapted to slideably and rotatably receive said tubular member wherein said first component includes two fishing rod holding members each including said tubular member.

5. A multiple use fishing assembly as in claim 4 wherein said extension member is removably secured to said base via a removable attaching means, a first tower including a first end and a second end, said first end is designed to be removably secured to said base via said attaching means, said second end is designed to be removably secured to said extension member via said attaching means, a second tower being shorter in height than said first tower, said second tower includes a first end and a second end, said first end of said second tower is designed to be removably secured to said base via said attaching means, said second end of said second tower is designed to be removably secured to said base via said attaching means, where said extension, said first tower and said second tower enable a height alteration for altering height of said fishing assembly.

6. A multiple use fishing assembly as in claim 5, wherein said base can rotate with respect to said first tower or said second tower via a rotational means.

7. A multiple use fishing assembly as in claim 6 wherein at least one threaded opening extends through said rearwardly extending member, and each threaded opening receives an eyelet.

8. A multiple use fishing assembly as in claim 1 wherein at least two extension members are provided, each extension member being removably secured to said base via a removable attaching means, said first extension member including a first cylindrical portion located at a top end and said second extension member including a second cylindrical portion located at a second top end, said first portion being substantially shorter than said second portion, and each extension member includes a lower portion extension member to fit into said conventional fishing rod holder of said boat.

9. A multiple use fishing assembly as in claim 1 wherein said extension member is removably secured to said base via a removable attaching means, a first tower including a first end and a second end, said first end is designed to be removably secured to said base via said attaching means, said second end is designed to be removably secured to said extension member via said attaching means, a second tower being shorter in height than said first tower, said second tower includes a first end and a second end, said first end of said second tower is designed to be removably secured to said base via said attaching means, said second end of said second tower is designed to be removably secured to said base via said attaching means, where said extension, said first tower and said second tower enable a height alternation for altering height of said fishing assembly.

10. A multiple use fishing assembly as in claim 9, wherein said base can rotate with respect to said first tower or said second tower via a rotational means.

11. A multiple use fishing assembly as in claim 1 wherein at least one threaded opening extends through said rearwardly extending member, and each threaded opening receives an eyelet.

12. A multiple use fishing assembly as in claim 1 wherein said inner portion is rotationally and removably secured to said base via said securing means.

13. A multiple use fishing assembly as in claim 12 wherein said securing means comprises a plurality of openings radially disposed along said flange and a central opening located near a lower area of said flange and aligned with lowermost holes of said plurality of openings radially disposed, said inner portion includes a pair of parallel disposed prong members forming an opening for receiving said flange member of said base, a first opening extends through said parallel prong members at one end and a second opening extends through said parallel prong members at a second end and said first opening being alignable with said central opening of said flange of said base, and said plurality of holes being alignable with said second opening, a locking pin removably secured to said first opening and said central opening, and a second locking pin is removably secured to said second opening of said inner portion and one opening of said plurality of openings radially disposed to enable a user to remove said second locking pin for providing rotation displacement with respect to said central opening.

14. A multiple use fishing assembly as in claim 1 wherein a fishing rod holding unit is removably secured to said flange via an attaching means.

15. A multiple use fishing assembly as in claim 14 wherein said fishing rod holding unit includes a base member, said base member includes a first opening and a second opening, said first opening is vertically aligned with said second opening, said flange includes a first aperture and a second aperture vertically aligned, said first opening of said base member being alignable to said first aperture of said flange, said second opening of said base member being alignable with said second aperture of said flange, a locking device being removably secured to each pair of aligned openings, a fishing rod holder being secured to said base member for providing said fishing rod holder and said base member forming said fishing rod holding unit.

* * * * *